(12) United States Patent
Taha

(10) Patent No.: US 6,640,988 B2
(45) Date of Patent: *Nov. 4, 2003

(54) CONTAINER CLOSURE

(76) Inventor: Saad Taha, 5253 Plano Pkwy., Plano, TX (US) 75093

( * ) Notice: Subject to any disclaimer, the term of this patent is extended or adjusted under 35 U.S.C. 154(b) by 0 days.

This patent is subject to a terminal disclaimer.

(21) Appl. No.: 10/252,151

(22) Filed: Sep. 20, 2002

(65) Prior Publication Data

US 2003/0015490 A1 Jan. 23, 2003

Related U.S. Application Data

(63) Continuation of application No. 09/605,273, filed on Jun. 28, 2000, now Pat. No. 6,491,175.

(51) Int. Cl.[7] .................... B65D 39/00; B65D 41/00; B65D 43/00; B65D 47/00; B65D 51/00
(52) U.S. Cl. ..................... 215/252; 215/44; 215/45; 215/307; 215/329; 215/341; 215/344; 215/354; 220/288
(58) Field of Search ................ 215/252, 44, 45, 215/307, 329, 318, 341, 343, 344, 346, 354; 220/288, 296

(56) References Cited

U.S. PATENT DOCUMENTS

| 1,910,913 A | 5/1933 | Conner |
| 2,068,389 A | 1/1937 | Smith |
| 3,001,657 A | 9/1961 | Gamble |

(List continued on next page.)

FOREIGN PATENT DOCUMENTS

| DE | 2726431 A1 | 1/1979 |
| DE | GM7933540 | 4/1980 |
| EP | 0008190 | 2/1980 |
| EP | 0117104 | 8/1984 |
| EP | 0390412 | 10/1990 |
| GB | 1054308 | 1/1967 |
| GB | 2039817 | 8/1980 |
| JP | 5674445 | 6/1981 |
| WO | WO9414673 | 7/1994 |
| WO | 635434 A1 | 1/1995 |
| WO | WO9624532 | 8/1996 |
| WO | WO 00 10888 A1 | 3/2000 |
| WO | WO 00/34133 | 6/2000 |

*Primary Examiner*—Robin A. Hylton
(74) *Attorney, Agent, or Firm*—Christopher J. Rourk; Akin Gump Strauss Hauer & Feld, LLP

(57) ABSTRACT

A closure for a container with a neck portion and an external helical thread formed on the neck portion includes an upper wall and a skirt formed integrally with and extending generally downwardly from the upper wall. An internal helical thread is formed on the skirt for engaging the external helical thread of the neck portion to thereby secure the closure to the container. The internal helical thread is preferably asymmetrical in cross section. A first annular seal extends generally radially inwardly toward a central axis of the closure from the inner skirt surface. The first annular seal sealingly engages the outer surface of the neck portion. A second annular seal extends generally axially downwardly from the upper wall and sealingly engage an inner surface of the neck portion. A thickness of the neck portion between the first and second annular seals is greater than the distance between the first and second annular seals before installation of the closure on the container. When the closure is installed on the container, the first and second annular seals are biased toward each other and against the outer and inner surfaces, respectively. A third annular seal is provided on a lower surface of the upper wall between the first and second annular seals for engaging an upper edge of the container neck portion. A tamper-evident security ring is frangibly connected to the skirt and includes a plurality of tabs that prevent removal of the security ring from the container.

19 Claims, 5 Drawing Sheets

U.S. PATENT DOCUMENTS

| | | |
|---|---|---|
| 3,255,907 A | 6/1966 | Eddy |
| 3,329,295 A | 7/1967 | Fields |
| 3,441,161 A | 4/1969 | Van Baarn |
| 3,568,871 A | 3/1971 | Livingstone |
| 3,704,819 A | 12/1972 | Lindstrom |
| 3,933,308 A | 1/1976 | Bradley et al. |
| 3,944,103 A | 3/1976 | Cros |
| 4,033,472 A | 7/1977 | Aichinger |
| 4,153,174 A | 5/1979 | Keeler |
| 4,156,490 A | 5/1979 | Peraboni |
| 4,206,851 A | 6/1980 | Ostrowsky |
| 4,206,852 A | 6/1980 | Dunn et al. |
| 4,331,249 A | 5/1982 | Banich, Sr. |
| 4,343,408 A | 8/1982 | Csaszar |
| 4,418,828 A | 12/1983 | Wilde et al. |
| 4,470,513 A | 9/1984 | Ostrowsky |
| 4,476,987 A | 10/1984 | Nolan |
| 4,478,343 A | 10/1984 | Ostrowsky |
| 4,488,655 A | 12/1984 | Itsubo et al. |
| 4,489,845 A | 12/1984 | Aichinger et al. |
| 4,546,892 A | 10/1985 | Couput |
| 4,550,844 A | 11/1985 | Lininger |
| 4,552,328 A | 11/1985 | Dutt et al. |
| 4,560,077 A | 12/1985 | Dut |
| 4,564,112 A | 1/1986 | Breuer |
| 4,567,993 A | 2/1986 | Albrecht et al. |
| 4,595,110 A | 6/1986 | Herr |
| 4,609,115 A | 9/1986 | Moore et al. |
| 4,674,643 A | 6/1987 | Wilde et al. |
| 4,691,834 A | 9/1987 | Bullock, III |
| 4,697,716 A | 10/1987 | Mumford |
| 4,732,289 A | 3/1988 | Granat et al. |
| RE32,879 E | 2/1989 | Wright et al. |
| RE33,265 E | 7/1990 | Gregory et al. |
| 4,978,016 A | 12/1990 | Hayes |
| 4,981,230 A | 1/1991 | Marshall et al. |
| 4,983,084 A | 1/1991 | Gray |
| 5,050,754 A | 9/1991 | Marino |
| 5,074,425 A | 12/1991 | Wüstmann et al. |
| 5,259,522 A | 11/1993 | Morton |
| 5,275,287 A | 1/1994 | Thompson |
| 5,282,540 A | 2/1994 | Beck |
| 5,328,044 A | 7/1994 | Röhrs et al. |
| 5,400,913 A | 3/1995 | Kelly |
| 5,465,858 A | 11/1995 | Gargione |
| 5,570,798 A | 11/1996 | Hayashida et al. |
| 5,609,263 A | 3/1997 | Perchepied |
| 5,673,809 A | 10/1997 | Ohmi et al. |
| 5,676,269 A | 10/1997 | Blake et al. |
| 5,725,115 A | 3/1998 | Bösl et al. |
| 5,727,705 A | 3/1998 | Kelly |
| 5,785,196 A | 7/1998 | Montgomery |
| 5,803,281 A | 9/1998 | Towns |
| 5,803,286 A | 9/1998 | Pfefferkorn et al. |
| 5,871,111 A | 2/1999 | Pferrerkorn et al. |
| 6,006,930 A | 12/1999 | Dreyer et al. |
| 6,338,414 B1 | 1/2002 | Schellenbach |
| 6,367,640 B1 * | 4/2002 | Julian .................. 215/329 |
| 6,491,175 B1 * | 12/2002 | Taha .................... 215/252 |

\* cited by examiner

CONTAINER CLOSURE

CROSS-REFERENCE TO RELATED APPLICATIONS

This application is a continuation of U.S. patent application Ser. No. 09/605,273 filed on Jun. 28, 2000 now U.S. Pat. No. 6,491,175.

BACKGROUND OF THE INVENTION

1. Field of the Invention

This invention relates in general to container closures, and more particularly to a container closure having multiple sealing surfaces and a tamper-evident ring.

2. Description of the Related Art

Various tamper-evident closures have been proposed wherein a threaded cap has a skirt portion with internal threads for connecting the cap to the threaded neck of a container. A security ring is typically formed during molding of the cap and frangible connections are formed after molding by cutting or slitting openings into the closure at the juncture of the security ring and skirt portion. The security ring may be provided with a plurality of circumferentially spaced, inwardly and upwardly extending tabs or fingers integrally connected to the ring. The outer free ends of the fingers are adapted to engage beneath a shoulder or ledge on the container neck below the threaded portion. In this manner, the cap is prevented from being removed from the container until twisted a sufficient distance to break the frangible connection and thereby separate the cap from the ring.

Closures of the above-mentioned type are typically manufactured with medium or high density polyethylene materials through die casting or thermoforming. The materials must be sufficiently resilient and flexible to enable extraction of the male die member from the cavity of the closure despite the presence of the inwardly and upwardly extending fingers. Since the closures are anchored to the container mainly by engagement of the fingers with the shoulder or ledge, the required flexibility and resilience of the closure to enable separation from the die may also enable the closure to be relatively easily removed from the container without breaking the frangible connection between the skirt and the security ring by slipping the closure off the container in a direction parallel with the axis of the container neck. This is particularly disadvantageous since there is no clear indication that the container has been tampered with.

In recognition of this problem, UK Patent Application No. GB 2 039 817 proposes die molding a closure out of relatively rigid plastics material, such as polypropylene. However, the die-molding process itself is relatively time consuming and therefore contributes to an increase in the cost of manufacturing the closure. In addition, the formation of frangible bridges requires a further processing step wherein openings between the bridges are cut or slit at the intersection of the security ring and skirt portion of the closure. The extra processing step requires extra equipment, time, and energy and thereby contributes to the overall cost of the closure.

Other closure designs depend on adding a different material on the bottom surface of the closure top wall to maintain sealing against leakage. The addition of any material to the cap requires more steps in manufacturing and assembly, and also contributes to an increase in closure manufacturing costs. Thus, it is desirous to produce a closure that is of single piece construction.

As desirable as the one-piece plastic closure may be, there are a number of problems associated with its use. For example, it is difficult to maintain a seal between the closure and container over an extended period of time under various conditions of packing, storing and handling. Once the closure is firmly engaged on the container, whether by threads or some other means, various parts of the closure are under stress because of forces required to effect a seal. These stresses tend to cause cold flow or creep of the closure material and may cause a breach in the seal between the closure and container. This tendency is augmented when the closure and container are subject to internal pressure from carbonated beverages. A plastic material's tendency to creep is further affected by elevated temperatures, which may result in a breach of the seal and consequential leakage and/or spoilage of the contents.

Even when the closure is sufficient to retain the beverage in a carbonated state, removal of the closure for dispersing the beverage causes seal degradation to the point where the closure cannot retain its prior sealing ability. Consequently, the beverage will lose much of its carbonation in a relatively short period of time and is often discarded before being completely consumed.

In addition to the above drawbacks, the internal threads in prior art closures are typically symmetrical in cross section. Although this construction may facilitate attachment of the closure to the container, the internal threads may not properly seal against the external threads of the container. Moreover, the molding process for closures with threads of this nature typically requires the core mold to be rotated or unscrewed from the interior of the closure after closure formation. This is a time consuming process and is much less efficient than if the core mold were to be withdrawn from the formed closure without rotation.

SUMMARY OF THE INVENTION

According to one embodiment of the invention, a closure is provided for connection to a container. The container typically has a neck portion and an external helical thread formed on an outer surface of the neck portion. The closure comprises an upper wall and a skirt formed integrally with and extending generally downwardly from the upper wall. The skirt includes an inner surface with an internal helical thread formed thereon for engaging the external helical thread of the neck portion to thereby secure the closure to the container. The internal helical thread is of asymmetrical shape in cross section and has a crown spaced from the skirt inner surface, an upper thread surface extending generally upwardly and away from the crown to the skirt inner surface, and a lower thread surface extending generally downwardly and away from the crown to the skirt inner surface. A length of the upper thread surface is greater than a length of the lower thread surface to thereby form the asymmetrical shape. Preferably, the upper thread surface is shaped to sealingly engage a lower surface of the external helical thread to thereby hold the closure on the container against relatively high internal container pressure acting on the closure.

According to a further embodiment of the invention, a closure comprises an upper wall and a skirt formed integrally with and extending generally downwardly from the upper wall. The skirt has an inner surface with an internal helical thread formed thereon for engaging the external helical thread of the neck portion to thereby secure the closure to the container. The internal helical thread comprises a crown spaced from the skirt inner surface, an upper thread surface extending generally upwardly and away from the crown to the skirt inner surface, and a lower thread surface extending generally downwardly and away from the crown to the skirt inner surface. An absolute value of an average slope of the upper thread surface is greater than an absolute value of an average slope of the lower thread surface to thereby form an asymmetrical cross sectional shape.

According to an even further embodiment of the invention, a closure comprises an upper wall, a skirt formed integrally with and extending generally downwardly from the upper wall, and a tamper-evident security ring connected to the skirt. The skirt includes an inner skirt surface with an internal helical thread formed thereon for engaging the external helical thread of the neck portion to thereby secure the closure to the container. The internal helical thread comprises a crown spaced from the skirt inner surface, an upper thread surface extending generally upwardly and away from the crown to the skirt inner surface and a lower thread surface extending generally downwardly and away from the crown to the skirt inner surface. Preferably, the length of the upper thread surface is greater than the length of the lower thread surface to thereby form an asymmetrical cross sectional shape. The upper thread surface is adapted to sealingly engage a lower surface of the external helical thread when the closure is installed on the neck portion. A first annular seal is formed on the inner surface and extends generally radially inwardly toward a central axis of the closure. The first annular seal is adapted to sealingly engage the outer surface of the neck portion. A second annular seal extends generally axially downwardly from the upper wall. The second annular seal is adapted to sealingly engage an inner surface of the neck portion. Preferably, a thickness of the neck portion between the first and second annular seals is greater than the distance between the first and second annular seals before installation of the closure on the container, such that when the closure is installed on the container, the first and second annular seals are biased toward each other with the first annular seal exerting inward radial pressure on the outer surface of the neck portion and the second annular seal exerting outward radial pressure on the inner surface of the neck portion. A third annular seal is located on a lower surface of the upper wall between the first and second annular seals. The third annular seal is adapted to engage an upper edge of the neck that extends between the inner and outer surfaces of the neck portion. The tamper-evident security ring is adapted to contact an annular shoulder of the container neck portion. The security ring comprises an annular wall and a plurality of circumferentially spaced retaining tabs. Each retaining tab has an inner end resiliently connected to the annular wall through an integral hinge and an outer free end. Installation of the closure on the neck portion causes the retaining tabs to elastically deflect toward the annular wall when the outer free ends pass by the shoulder and then to bias against the outer surface of the neck portion below the annular shoulder when the closure is installed on the neck portion.

These and other features and advantages of the invention will become apparent upon reference to the following detailed description and the accompanying drawings.

BRIEF DESCRIPTION OF THE DRAWINGS

The preferred embodiments of the present invention will hereinafter be described in conjunction with the appended drawings wherein.

Figure 1:
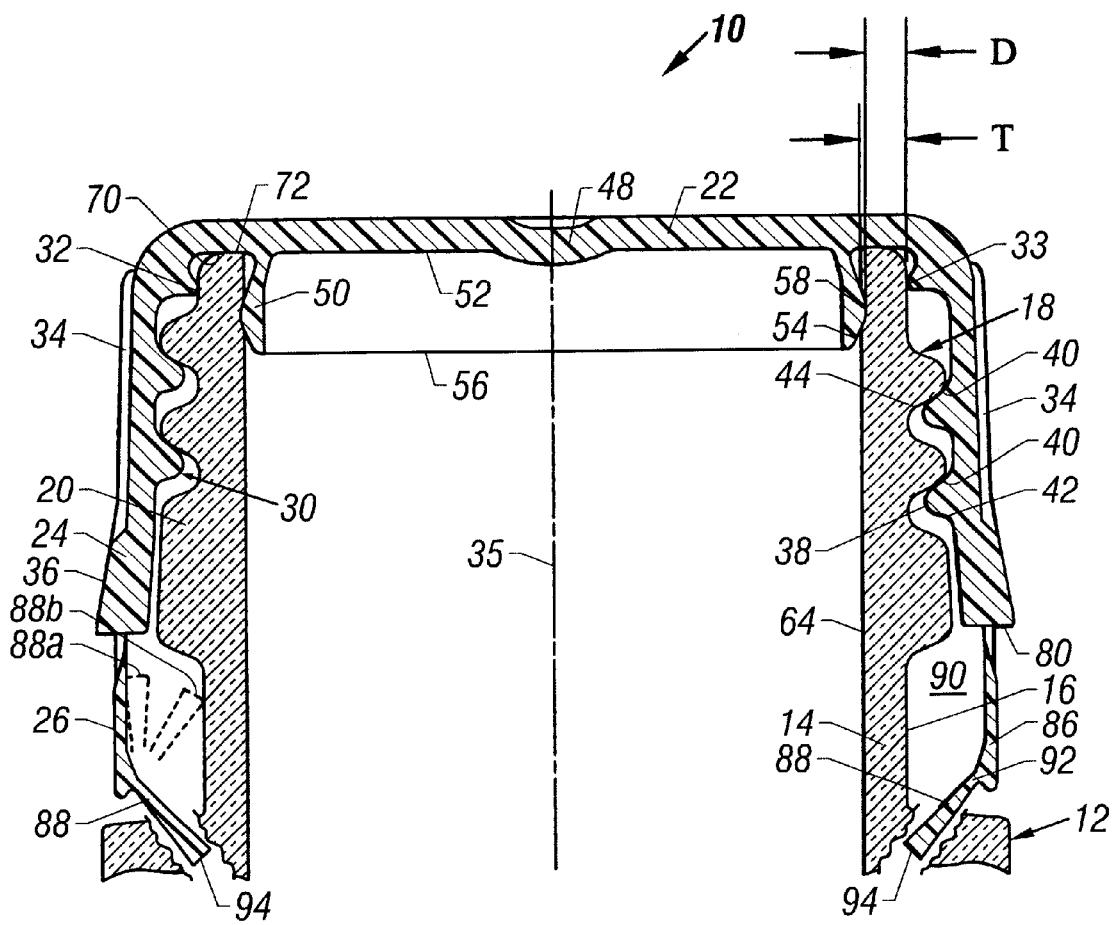
FIG. 1 is an enlarged cross sectional view of a container closure according to the invention mounted on the neck of a container.
Figure 2:
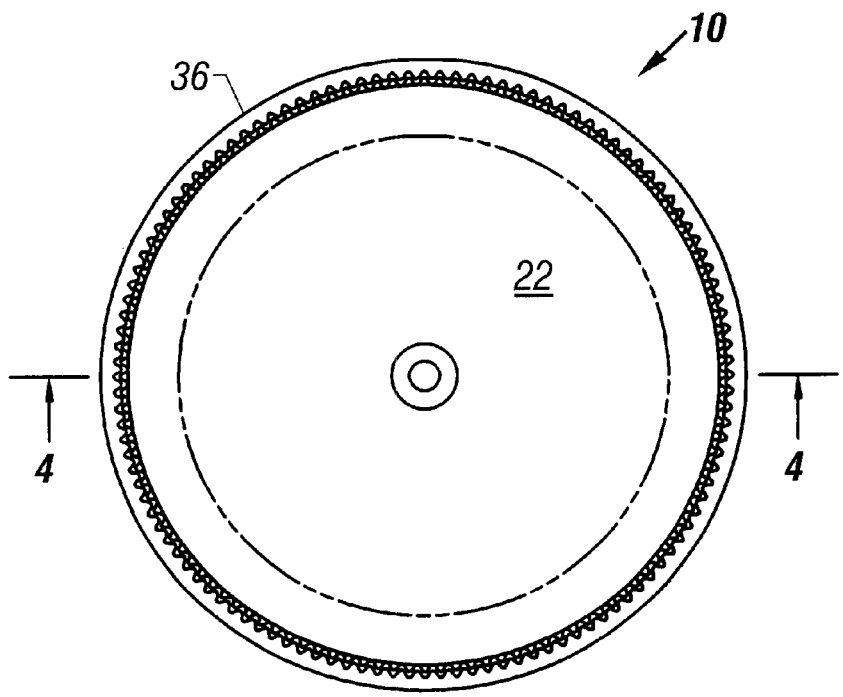
FIG. 2 is a top plan view of a container closure according to the invention.

It is noted that the drawings are intended to represent only typical embodiments of the invention and therefore should not be construed as limiting the scope thereof.

The invention will now be described in greater detail with reference to the drawings, wherein like parts throughout the drawing figures are represented by like numerals.

DETAILED DESCRIPTION OF THE PREFERRED EMBODIMENTS

Referring now to the drawings, and to FIG. 1 in particular, an exemplary embodiment of a closure 10 for connection to a container 12 is illustrated. An upper end of the container 12 includes a neck portion 14 with an external helical thread 18 and an annular shoulder 20 formed on an outer surface 16 thereof. As shown, the shoulder 20 is located below the thread 18 in a well known arrangement.

The closure 10 includes an upper wall 22 and a skirt 24 that is integrally formed with and extends downwardly from the upper wall. As shown, the skirt 24 is generally cylindrical in shape but may be conical or of some other shape in order to accommodate the shape of the neck portion 14. A tamper-evident security-ring 26 may be frangibly connected to a lower end of the skirt 24. The closure 10, including the upper wall, skirt and security ring 26, is preferably integrally formed from a relative stiff plastic material, such as polypropylene, through injection molding, although other known forming processes may be used.

With additional reference to FIGS. 2 through 5, the skirt 24 includes an inner surface 28 with an internal helical thread 30 formed thereon for engaging the external helical thread 18 of the neck portion 14 when the closure 10 is installed on the container 12. A first annular seal 32 is formed integral with the inner, surface 28 and extends generally radially inwardly toward a central axis 35 of the closure 10. An apex area 33 of the first annular seal 32 is adapted to sealingly engage the outer surface 16 of the neck portion 14 above the external thread 18. A plurality of ribs 34 are formed on an outer surface 36 of the skirt 24 to enhance gripping of the closure by a user.

Figure 8:
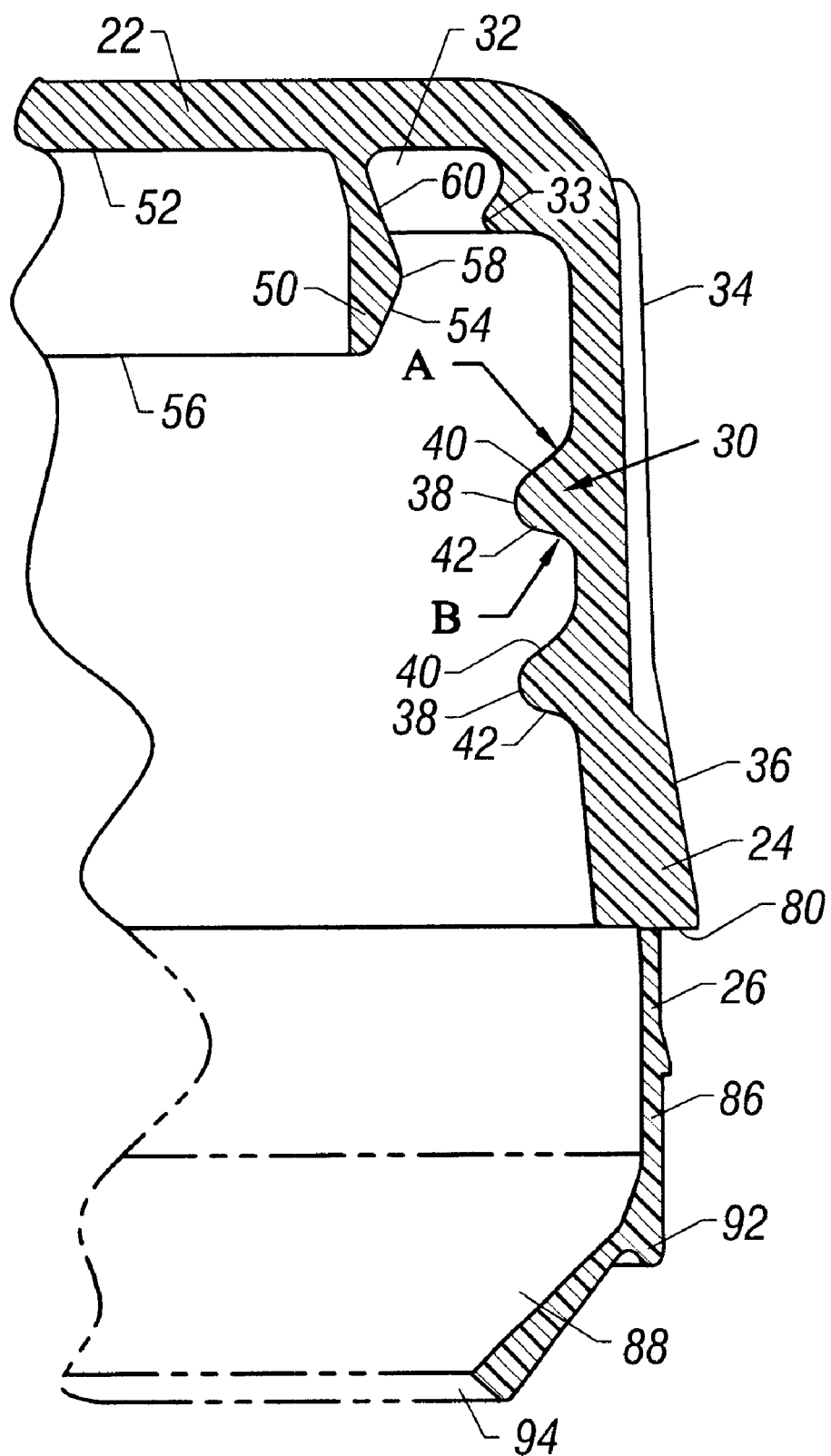
FIG. 8 is an enlarged cross sectional view of a portion of the container closure illustrating the thread and seal details.

With reference now to FIG. 8, the internal helical thread 30 includes a crown 38 integrally formed with an upper curved surface 40 with a first radius A and a lower curved surface 42 with a second radius B that is different from the first radius A to thereby form an internal thread that is asymmetrical in cross section. Preferably, the first radius A is greater than the second radius B, such that an arc length of the upper thread surface is greater than an arc length of the lower thread surface, with the absolute value of the average slope of the upper thread surface being greater than the absolute value of the average slope of the lower thread surface. This arrangement is especially advantageous during the molding process. The upper curved surface of the internal thread 30 and the corresponding mold or core surface (not shown) facilitate removal of the core from the interior of the closure in a linear direction parallel with the closure central axis 35 without stripping the internal thread 30. This feature greatly increases the closure production rate and decreases mold costs over the prior art where the core must be rotated out of the closure interior. Linear removal of the core is preferably accomplished while the material is still warm, but after it is set in the mold. The lower surface 80 of the skirt may be in contact with a movable mold section during the molding process so that the closure 10 may be linearly ejected from the core mold.

The asymmetric cross sectional shape of the internal thread 30 also allows for greater variation in container tolerance and external thread shape since more, surface area on the upper surface 40 is available for contacting a lower surface 44 (FIG. 1) of the external thread 18 on the neck portion 14 when the closure 10 is attached to the neck portion. As shown in FIG. 1, the upper surface 40 of the internal thread 30 may be different in curvature or slope than the lower surface 44 of the external thread 18 to accommodate a wide variety of external thread shapes and tolerances. The asymmetric cross sectional shape of the internal thread 30 assures that full contact is maintained between the external thread 18 of the neck portion 14 and the internal thread 30. This feature minimizes the deformation that may occur due to a rise in pressure in the container 12.

Figure 6:
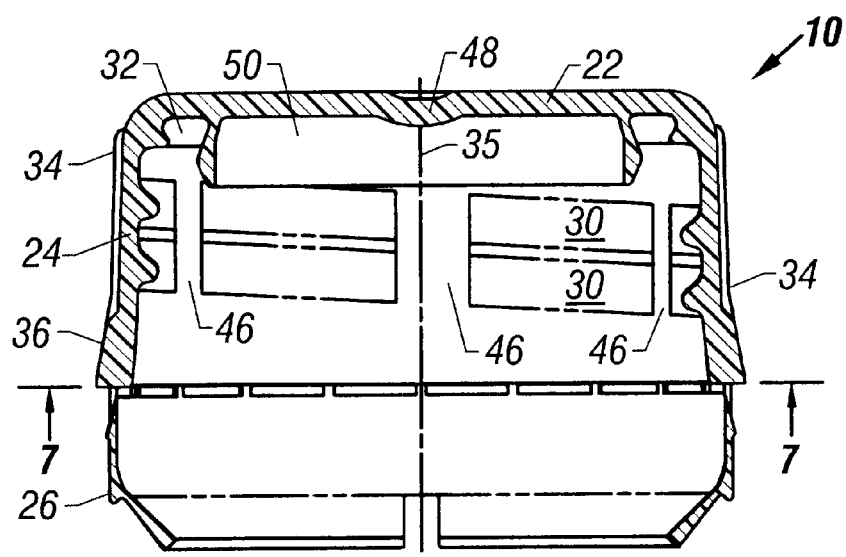
FIG. 6 is a cross sectional view similar to FIG. 4 of a container closure according to a further embodiment of the invention.
Figure 7:
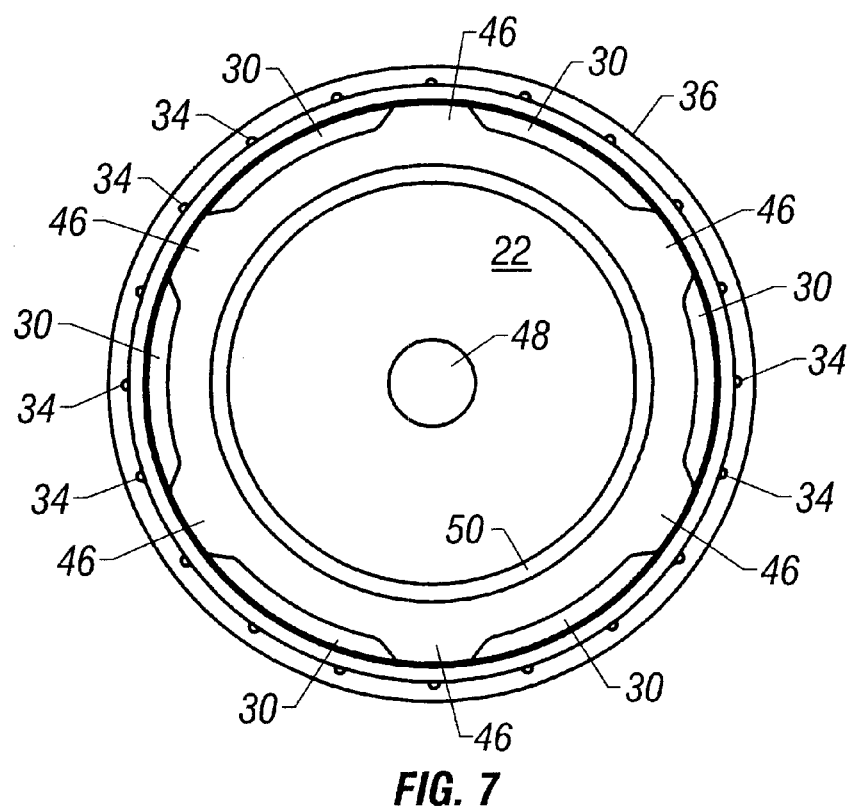
FIG. 7 is a cross sectional view of the container closure taken along line 7—7 of FIG. 6.

As shown in FIGS. 6 and 7, and according to a further embodiment of the invention, the internal helical thread 30 may be interrupted by circumferentially spaced vent slots 46. The number of vent slots 46 preferably match the number of vent slots (not shown) extending through the external helical thread 18 of the neck portion 14 when so equipped. The vent slots 46 are normally out of alignment with the vent slots of the container when the closure 10 is fully seated to thereby enhance the maximum pressure to which the closure 10 can be exposed without bursting or leaking. In a preferred embodiment, the closure 10 is designed to withstand pressures of about 175 psi or more. This embodiment is especially suitable for carbonated beverage containers, since initial twisting of the closure will cause the vents in the closure and container to at least partially align and release any pressure within the container before the internal and external threads are disengaged.

Referring now to FIGS. 1, 3, 4 and 8, the upper wall 22 includes a depression 48 formed therein and a second annular seal 50 formed on a lower surface 52 of the upper wall 22. The depression 48 is coincident with an injection port of an injection molding machine (not shown) during formation of the closure 10. Where other molding processes are used, the depression 48 may be eliminated. The second annular seal 52 extends in a generally axial direction and includes an upwardly sloped surface 54 that extends outwardly and upwardly from a lower edge 56 to a seal apex area 58 and a downwardly sloped surface 60 that extends outwardly and downwardly from the lower surface 52 of the upper wall 22 to the seal apex area 58. The apex area 58 of the second annular seal 50 is adapted to sealingly engage the inner surface 64 of the neck portion 14 above the external thread 18. Preferably, the distance "D" between the apex area 33 of the first annular seal 32 and the apex area 58 of the second annular seal 50 is less than the thickness "T" of the neck portion 14 between the apex areas, as shown in FIG. 1. In this manner, the first and second annular seals are biased tightly against the neck 14 and create a double seal between the closure 10 and container 12. A third annular seal 70 is provided by the bottom surface 52 of the upper wall 22 between the first and second annular seals 32, 50. The third annular seal 70 is in sealing engagement with an upper edge 72 of the neck portion 14 when the closure is completely installed on the container.

With this arrangement, the contents within the container 12 are isolated from the atmosphere outside the container by three separate annular seals. The shape of the annular seals creates a positive sealing engagement with the neck portion 14 without excessive friction that would otherwise require additional torque to open and close the container 12. The provision of three seals is especially advantageous when the container and closure are subjected to internal pressure, such as when a carbonated beverage is located in the container. Under internal pressure, the upper wall will tend to bow outwardly, which in turn will cause the first annular seal 32 to increase its contact pressure with the outer surface 16 of the neck portion 14. Concurrently, the contact pressure between the second annular seal 50 and the inner surface 64 of the neck portion 14 will increase. In addition, the multiplicity of annular seals (besides the sealing engagement between the internal and external threads) assures that the contents of the container will remain sealed even if one or two of the annular seals were to fail. In this manner, carbonated beverages can maintain their carbonation for longer periods of time than prior art closures, even when the closure 10 of the present invention has been removed and reinstalled on the container.

Figure 3:
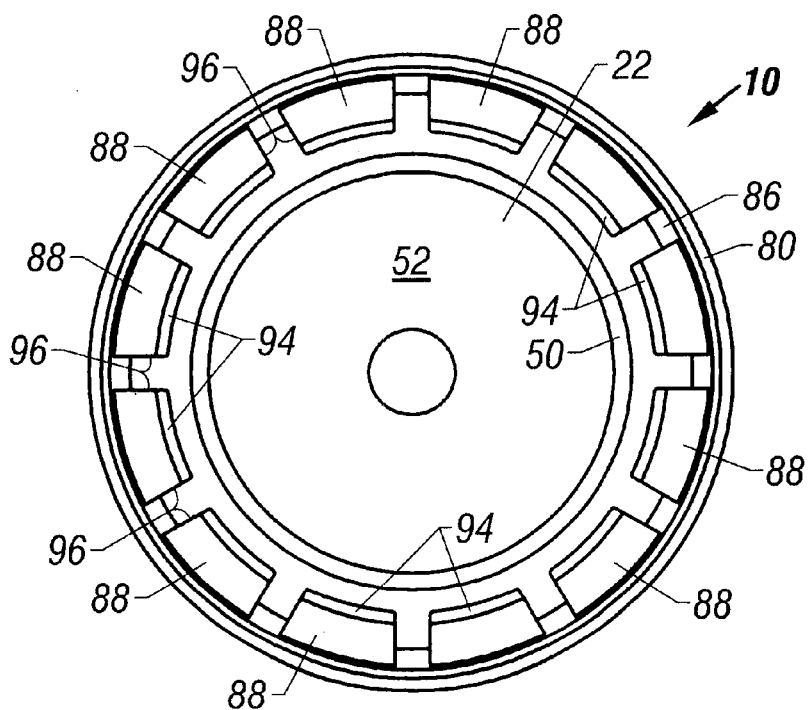
FIG. 3 is a bottom plan view of the container closure.
Figure 4:
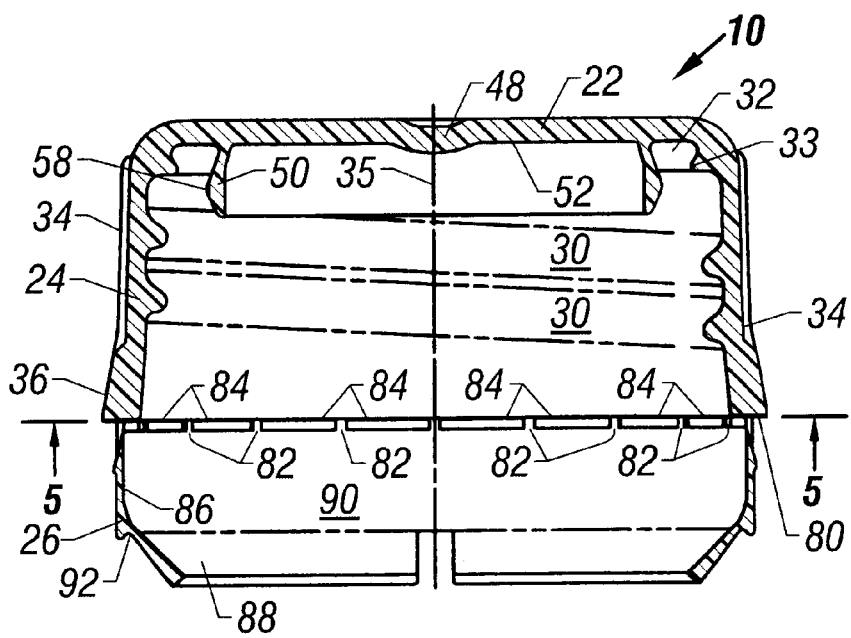
FIG. 4 is a cross sectional view of the container closure taken along line 4—4 of FIG. 2.
Figure 5:
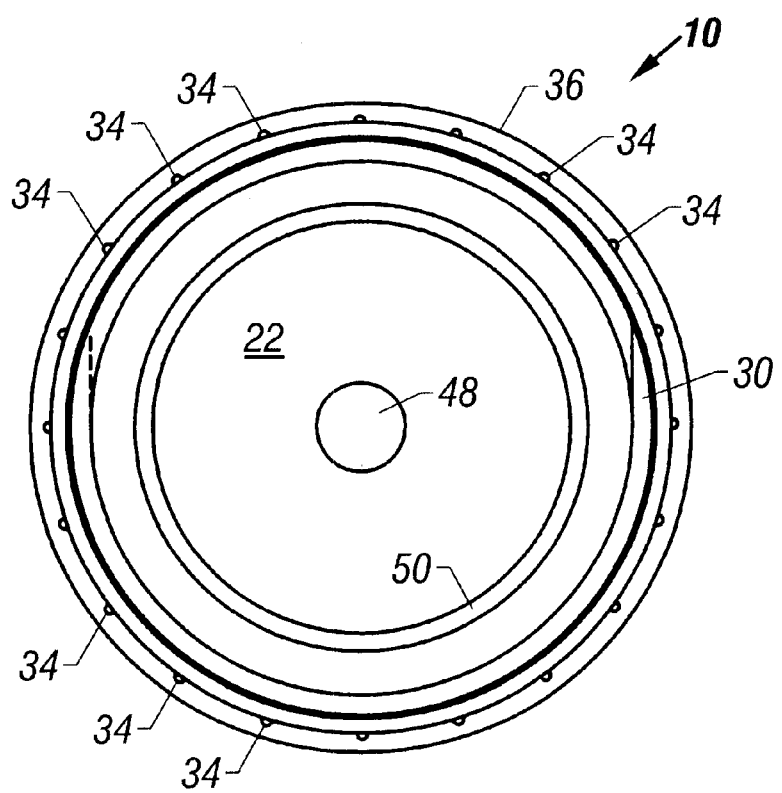
FIG. 5 is a cross sectional view of the container closure taken along line 5—5 of FIG. 4.

As shown most clearly in FIGS. 1, 3, 4 and 8, the security ring 26 is connected to a lower surface 80 of the skirt 24 through circumferentially spaced ribs 82 that are separated by windows or slots 84. The ribs 82 are preferably of sufficient thickness and width to resist forces that may occur during installation of the closure 10 on the container 12. The security ring 26 includes an annular wall 86 and a plurality of circumferentially spaced retaining tabs 88 connected to an inner surface 90 of the annular wall through integral hinges 92. When formed, the tabs 88 preferably initially extend at an obtuse angle with respect to the annular wall 86 to facilitate removal of the core mold. A subsequent forming operation may include bending the tabs 88 to form a perpendicular or acute angle with the annular wall 86 by pressing a mandrel or the like against the tabs until they are plastically deformed to the desired position. In this manner, less force is required to install the closure 10 on the container 12. The tabs 88 as shown in FIG. 8 gradually increase in thickness from the integral hinge 92 to an outer free end 94 thereof. Alternatively, the tabs may be of constant or decreasing thickness. As shown in FIG. 3, the outer free ends 94 of the tabs 88 are concave. In a further embodiment, the outer free ends may be straight or convex. Moreover, although the tabs are shown as separate from each other, they may be joined at their radially extending edges 96 through a flexible web or the like.

With reference again to FIG. 1, a capping operation wherein the closure 10 is secured on the neck portion 14 of the container 12 will now be described. Initially, the closure 10 is aligned with the neck portion 14. As shown, the lower end of the skirt 24 may be slightly flared to facilitate alignment. The closure 10 is lowered into contact with the neck portion 14. The retaining tabs 88 (now extending perpendicular to or forming an acute angle with the annular wall 86) will contact the external thread 18 and annular shoulder 20 of the neck portion 14 and flex to a position 88A. As the outer free end 94 of the retaining tabs 88 clear the shoulder 20, they will spring back to a position 88B wherein the outer free end is in contact with the outer surface 16 of the neck portion 14. Depending on the original orientation of the retaining tabs 88, a biasing force may be created against the outer surface 16. As the internal closure thread 30 engages the external container thread 18 during the capping operation, the upward sloped surface 54 of the second annular seal 50 will contact the upper edge 72 of the neck portion 14 and deform the second annular seal radially inwardly until the apex 58 of the second annular seal contacts the inner surface 64 of the neck portion to thereby bias the first and second annular seals against the neck portion. As the closure is twisted further onto the neck portion, the third annular seal 70 will seat against the upper edge 72 with the upper surface 40 of the internal thread 30 in sealing contact with the lower surface 44 of the outer thread 18. Any attempt to remove the closure 10 from the container 12 will cause the retaining tabs 88 to contact the annular shoulder 20 and break the ribs 82 (FIG. 4) to thereby separate the closure 10 from the security ring 26.

Although the closure 10 has been shown and described in a particular orientation, it is to be understood that the invention is not limited thereto. The closure 10 may be connectable to a bottle or other container in any orientation. Accordingly, the terms upper, lower, upward, downward, and their respective derivatives and equivalent terms as may be used throughout the specification, including the claims, denote relative, rather than absolute positions or orientations.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A closure for connection to a container with a neck portion and an external helical thread formed on an outer surface of the neck portion, the closure comprising:
   an upper wall; and
   a skirt formed integrally with and extending generally downwardly from the upper wall, the skirt having an inner skirt surface with an internal helical thread formed thereon for engaging the external helical thread of the neck portion to thereby secure the closure to the container, the internal helical thread being of asymmetrical shape in cross section and having:
   a crown spaced from the skirt inner surface;
   an upper thread surface extending generally upwardly and away from the crown to the skirt inner surface; and
   a lower thread surface extending generally downwardly and away from the crown to the skirt inner surface;
   a length of the upper thread surface being greater than a length of the lower thread surface to thereby form the asymmetrical shape, the upper thread surface being shaped to sealingly engage a lower surface of the external helical thread to thereby hold the closure on the container against relatively high internal container pressure acting on the closure.

2. A closure according to claim 1, wherein the lengths of the upper and lower thread surfaces comprise arc lengths.

3. A closure according to claim 1, and further comprising:
   a first annular seal on the inner skirt surface, the first annular seal extending generally radially inwardly toward a central axis of the closure from the skirt, the first annular seal having a first apex area that is adapted to sealingly engage the outer surface of the neck portion; and
   a second annular seal extending generally downwardly from the upper wall, the second annular seal having a second apex area that is adapted to sealingly engage an inner surface of the neck portion;
   wherein the first annular seal is adapted to exert inward radial pressure on the outer surface of the neck portion and the second annular seal is adapted to exert outward radial pressure on the inner surface of the neck portion when the closure is installed on the container.

4. A closure according to claim 3, wherein the upper wall between the first and second annular seals forms a substantially flat third annular seal that is adapted to sealingly engage an entire upper edge of the neck portion extending between the inner and outer surfaces of the neck portion when the closure is installed on the container.

5. A closure according to claim 1, and further comprising at least one vent slot interrupting the internal helical thread.

6. A closure according to claim 1, wherein the neck portion of the container includes an annular shoulder below the external helical thread, and further comprising a tamper-evident security ring frangibly connected to a lower end of the skirt, the security ring being adapted to contact the annular shoulder when the closure is installed on the container.

7. A closure according to claim 6, wherein the security ring comprises:
   an annular wall; and
   a plurality of circumferentially spaced retaining tabs, each retaining tab having a first end resiliently connected to the annular wall through an integrally formed hinge extending between the first end and the annular wall, and each retaining tab further having a second free end extending toward a central axis of the security ring, whereby installation of the closure on the container causes the retaining tabs to elastically deflect toward the annular wall when the second free ends pass by the shoulder.

8. A closure according to claim 7, wherein the second free ends of the retaining tabs are adapted to bias against the outer surface of the neck portion below the annular shoulder when the closure is installed on the container.

9. A closure according to claim 1, herein the relatively high internal pressure is at least 175 psi.

10. A closure for connection to a container with a neck portion and an external helical thread formed on an outer surface of the neck portion, the closure comprising:
    an upper wall;
    a skirt formed integrally with and extending generally downwardly from die upper wall, the skirt having an inner surface with an internal helical thread formed thereon for engaging the external helical thread of the neck portion to thereby secure the closure to the container, the internal helical thread comprising:
    a crown spaced from the skirt inner surface;
    an upper thread surface extending generally upwardly and away from the crown to the skirt inner surface; and
    a lower thread surface extending generally downwardly and away from the crown to the skirt inner surface;
    an absolute value of an average slope of the upper thread surface being greater than an absolute value of an average slope of the lower thread surface to thereby form an asymmetrical cross sectional shape.

11. A closure according to claim 10, and further comprising at least one vent slot interrupting the internal helical thread.

12. A closure according to claim 10, and further comprising:
   a first annular seal formed on the inner skirt surface and extending generally radially inwardly toward a central axis of the closure, the first annular seal being adapted to sealingly engage the outer surface of the neck portion; and
   a second annular seal extending generally axially downwardly from the upper wall, the second annular seal being adapted to sealingly engage an inner surface of the neck portion.

13. A closure according to claim 12, wherein a distance between the first and second annular seals is less than a thickness of the neck portion of the container before installation of the closure on the container, with the first annular seal exerting inward radial pressure on the outer surface of the neck portion and the second annular seal exerting outward radial pressure on the inner surface of the neck portion when the closure is installed on the container.

14. A closure according to claim 13, wherein the upper wall between the first and second annular seals forms a third annular seal for sealingly engaging an upper edge of the neck portion extending between the inner and outer surfaces of the neck portion when the closure is installed on the container.

15. A closure according to claim 10, wherein the neck portion of the container includes an annular shoulder below the external helical thread, and further comprising a tamper-evident security ring frangibly connected to a lower end of the skirt, the security ring being adapted to contact the annular shoulder.

16. A closure according to claim 15, wherein the security ring comprises:
   an annular wall; and
   a plurality of circumferentially spaced retaining tabs, each retaining tab having a first end resiliently connected to the annular wall through an integrally formed hinge that extends between the first end and the annular wall, and each retaining tab further having a second free end extending toward a central axis of the security ring, whereby installation of the closure on the container causes the retaining tabs to elastically deflect toward the annular wall when the second free ends pass by the shoulder.

17. A closure according to claim 16, wherein the second free ends of the retaining tabs are adapted to bias against the outer surface of the neck portion below the annular shoulder when the closure is installed on the container.

18. A closure according to claim 10, wherein the upper thread surface is shaped to sealingly engage a lower surface of the external helical thread to thereby hold the closure on the container against relatively high internal container pressure acting on the closure when the closure is installed on the neck portion, the relatively high internal pressure being at least 175 psi.

19. In combination, a container and a closure for connection to the container, the container having a neck portion with an external helical thread formed on an outer surface of the neck portion, the closure comprising:
   an upper wall;
   a skirt formed integrally with and extending generally downwardly from the upper wall, the skirt having an inner skirt surface with an internal helical thread formed thereon for engaging the external helical thread of the neck portion to thereby secure the closure to the container, the internal helical thread comprising:
      a crown spaced from the skin inner surface;
      an upper thread surface extending generally upwardly and away from the crown to the skirt inner surface; and
      a lower thread surface extending generally downwardly and away from the crown to the skirt inner surface;
   a length of the upper thread surface being greater than a length of the lower thread surface to thereby form an asymmetrical cross sectional thread shape, the upper thread surface sealingly engaging a lower surface of the external helical thread when the closure is installed on the neck portion;
   a first annular seal formed on the inner skirt surface and extending generally radially inwardly toward a central axis of the closure from the inner skirt surface, the first annular seal having a first apex area that sealingly engages the outer surface of the neck portion;
   a second annular seal extending generally axially downwardly from the upper wall, the second annular seal having a second apex area that sealingly engages an inner surface of the neck portion, wherein a distance between the first and second apex areas is less than a thickness of the neck portion of the container before installation of the closure on the container, such that when the closure is installed on the container, the first annular seal exerts inward radial pressure on the outer surface of the neck portion and the second annular seal exerts outward radial pressure on the inner surface of the neck portion;
   the upper wall forming a third annular seal between the first and second annular seals, the third annular seal sealingly engaging an upper edge of the neck portion extending between the inner and outer surfaces of the neck portion when the closure is installed on the container; and
   a tamper-evident security ring connected to a lower end of the skirt, the security ring contacting the annular shoulder, the security ring comprising:
      an annular wall; and
      a plurality of circumferentially spaced retaining tabs, each retaining tab having a first end resiliently connected to the annular wall through an integrally formed hinge that extends between the first end and the annular wall, and a second free end that extends toward a central axis of the annular wall, whereby installation of the closure on the neck portion causes the retaining tabs to elastically deflect toward the annular wall when the outer free ends pass by the shoulder, the outer free ends being biased against the outer surface of the neck portion below the annular shoulder when the closure is installed on the neck portion.

* * * * *

UNITED STATES PATENT AND TRADEMARK OFFICE
CERTIFICATE OF CORRECTION

PATENT NO. : 6,640,988 B2
DATED : November 4, 2003
INVENTOR(S) : Saad Taha

It is certified that error appears in the above-identified patent and that said Letters Patent is hereby corrected as shown below:

Column 8,
Line 7, remove "apes" and add "apex".
Line 50, remove "die" and add "the".

Signed and Sealed this

First Day of June, 2004

JON W. DUDAS
*Acting Director of the United States Patent and Trademark Office*